United States Patent Office 3,185,700
Patented May 25, 1965

3,185,700
DICYANO-S-DIAMINOMETHYLENESULFILI-
DENES AND DICYANO-S-DI(SUBSTITUTED)
AMINOMETHYLENESULFILIDENES AND
PREPARATION THEREOF
William J. Middleton, Wilmington, Del., assignor to E. I.
du Pont de Nemours and Company, Wilmington, Del.,
a corporation of Delaware
No Drawing. Filed Mar. 29, 1963, Ser. No. 269,187
5 Claims. (Cl. 260—309.7)

This invention is concerned with a new class of organic compounds containing tetravalent sulfur and with a process for preparing such compounds.

In coassigned copending Middleton application Serial No. 269,141, filed March 29, 1963, there is shown the preparation of 2,2-dicyano-3,3-di(polyfluorohaloalkyl)-oxiranes by the organic peracid oxidation of the corresponding 1,1 - dicyano - 2,2 - di(polyfluorohaloalkyl)ethylenes. These in turn are prepared by dehydration of the corresponding hydroxy (di[polyfluorohaloalkyl])methylmalononitriles, the reaction products of malononitrile with polyfluorohaloalkyl ketones as shown in my copending, coassigned application Serial No. 200,645, filed June 7, 1962.

It has now been discovered that the 2,2-dicyano-3,3-di(polyfluorohaloalkyl)oxiranes react with thiocarbamoyl compounds (i.e., compounds having a —CSNR$_2$ group) to yield tetravalent sulfur compounds whose structures are derived by adding a dicyanomethylene substituent to the sulfur atom of the thiocarbamoyl compound. The reaction may be indicated generically as follows:

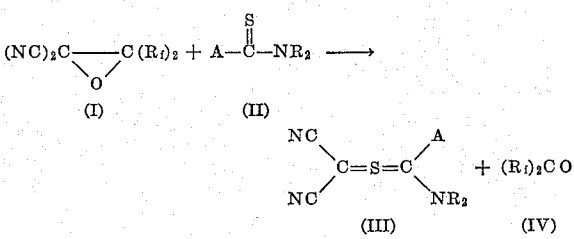

in which the R$_f$ groups may be alike or different and, separately, are perfluoroalkyl, ω-chloroperfluoroalkyl or ω-hydroperfluoroalkyl groups of up to 18 carbons, i.e., 18 or less, and, conjointly, are a perfluoroalkylene group of 3 to 8 carbon atoms, particularly hexafluorotrimethylene, octafluorotetramethylene, or decafluoropentamethylene; A may be an amine group (i.e., —NR$_2$); the R's, taken individually, represent aliphatically saturated hydrocarbyl of up to 20 carbons (i.e., any unsaturation is aromatic); and any two R's may be taken together to form an alkylene group of 2 to 18 carbons.

The particular nature of the compounds of Formula II determines whether the reaction of this invention stops with the formation of compounds of Formula III so that these compounds may be isolated. For example, in the preferred form of this invention, the thiocarbamoyl compounds of Formula II are those in which A is —NR$_2$ and each R is R', R' being hydrogen or aliphatically saturated hydrocarbyl of up to 20 carbons with its bond stemming from an aliphatic carbon (i.e., a carbon which is not a member of an aromatic ring), with the above-noted proviso that any two R' groups taken together may be an alkylene group of 2 to 18 carbon atoms. With these particular reactants, the products are those of Formula V:

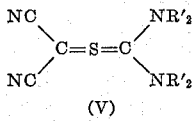

(V)

in which R' is defined as in the preceding sentence. Products of Formula V are stable under ordinary conditions and are readily isolated and purified.

Compounds of Formula V in which at least one —NR'$_2$ is —NH$_2$ may be cyclized to yield compounds of Formula VI:

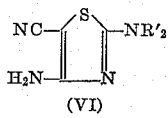

(VI)

by heating in the presence of water.

The word "hydrocarbyl" is used in its accepted sense as representing a radical formed from a hydrocarbon by removal of a hydrogen atom. The hydrocarbyl groups represented by the R"s in the formula above may be any radical composed solely of carbon and hydrogen and which is free of aliphatic carbon-to-carbon unsaturation, i.e., any unsaturation is aromatic. "Aliphatically saturated hydrocarbyl" is used in its full generic sense. The wide variation in the hydrocarbyl groups used in the illustrations which follow makes it evident that all aliphatically saturated hydrocarbyl groups of up to 20 carbons are operable, irrespective of whether they are alkyl, cycloalkyl, alkcycloalkyl, aryl, aralkyl, alkaryl, single ring, multi-ring, straight chain, branched chain, large, small, or the like. The widest variation of this sort does not in any way detract from the fundamental characteristic of the aliphatically saturated hydrocarbyl radical of passing unchanged through the process of this invention and exercising no effect whatever on the chemical steps of the process. Representative hydrocarbyl groups include methyl, tert.-butyl, isooctyl, dodecyl, octadecyl, eicosyl, cyclopropyl, cyclobutyl, cyclohexyl, cyclooctyl, phenyl, naphthyl, anthryl, benzyl, phenethyl, duryl, 4-isopropylnaphthyl, chrysyl, and the like.

By "aryl" is meant a monovalent hydrocarbon group with its bond stemming from a carbon of an aromatic ring, e.g., phenyl, naphthyl, anthryl, duryl, 4-isopropylnaphthyl, chrysyl, and the like. Preferably, the aryl group is solely aromatic (unsubstituted) or is alkyl substituted.

Representative alkylene groups containing 2–18 carbon atom include ethylene, trimethylene, tetramethylene, pentamethylene, heptamethylene, decamethylene, octadecamethylene, 2,2,3,3-tetramethyltetramethylene, and the like. Alkylene groups of 2–7 chain carbons are preferred.

The reaction of the present invention may be carried out without any additives by simply bringing the selected compounds of Formulas I and II into intimate contact as in impact grinding. However, since the reaction is somewhat exothermic, it is preferable to carry it out in the presence of a liquid organic diluent which is inert to the reactants and products. Such diluents include alcohols such as methanol, ethanol, butanol, and the like; ethers such as dimethyl ether, diethyl ether, tetrahydrofuran, and the like.

The temperature at which the reaction of this invention takes place may vary widely, i.e., from —80° to 250° C. It is preferred to operate at temperatures within the range from —40° to 100° C.

Pressure is not a critical factor in the process of this invention, and pressures both above and below atmospheric pressure are operable. Atmospheric pressure is preferred for convenience.

The molar ratio in which compounds of Formulas I and II may be brought together to carry out the reaction of this invention may be varied widely as from 19:1 to 1:19. However, there is no advantage in using a large excess of one or the other, and molar ratios in the range from 2:1 to 1:2 are preferred for the best yields.

The compounds of the present invention are of such unusual structure that no firm precedent has been found for naming them. The dicyano-S-(substituted-methylene)sulfilidene terminology was selected arbitrarily and is based on the common method for naming the related S-substituted sulfilimines. Thus, the compounds of Formula V are referred to as dicyano-S-diaminomethylenesulfilidenes and dicyano-S-di(substituted)aminomethylenesulfilidenes.

The prepartion of the 2,2-dicyano-3,3-bis(polyfluorohaloalkyl)oxirane starting materials for this invention is illustrated in Parts A, B, and C of Example I. The preparation is based on the known polyfluorohaloalkyl ketones and may be indicated by the following equations:

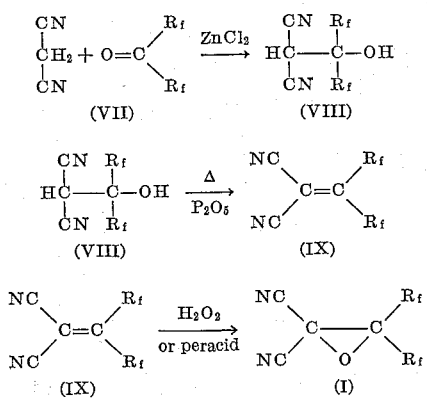

in which $R_f$ is as defined above.

The reaction of a polyfluorohaloalkyl ketone and malononitrile is conveniently carried out in the presence of zinc chloride as catalyst at a temperature in the range of about 50 to about 150° C. The resultant hydroxy compound (Formula VIII) is usually a crystalline solid which can be isolated and purified in a conventional manner, or which may be used directly (without purification) in the dehydration reaction to form the corresponding 1,1-dicyano,2,2-bis(polyflurohaloalkyl)ethylene.

Dehydration of the hydroxy[di(polyfluorohaloalkyl)]methylmalononitrile (VIII) is readily accomplished by heating it, preferably in the presence of a water acceptor, i.e., a substance that will react with or otherwise retain water. A dehydrating agent such as phosphorus pentoxide is of particular advantage as a water acceptor, and with use of such a dehydrating agent the product is conveniently separated as it is formed by distillation from the reaction vessel. Alternatively, the dehydration can be carried out in a vapor phase process in which the vaporized hydroxy compound is passed through a porous layer of a solid water acceptor, e.g., silica gel. The dehydration can also be accomplished by heating the hydroxy compound in the absence of a water acceptor, but since the dehydration reaction is reversible this method of operation is impractical unless an alternative method of separating the water from the ethylenic compound is used, e.g., fractional distillation.

The temperature of dehydration is generally above about 100° C., and when the product is removed by distillation, the reaction temperature will be somewhat above the boiling point of the product. However, the temperature of dehydration is not critical and can be quite high, e.g., above 300° C., since the 1,1-dicyano-2,2-bis(polyfluorohaloalkyl)ethylene products (Formula IX) are thermally stable.

The 1,1-dicyano-2,2-bis(polyfluorohaloalkyl)ethylenes (Formula IX) are converted to the corresponding 2,2,-dicyano-3,3-bis(polyfluorohaloalkyl)oxiranes (Formula I) by reaction with hydrogen peroxide or an organic peracid such as performic acid, peracetic acid, pertrifluoroacetic acid, perbenzoic acid, and the like. The peroxide or peracid is suitably introduced as a solution in water or an organic solvent such as acetonitrile, benzonitrile, acetone, acetic acid, diethyl ether, tetrahydrofuran, or the like. The reaction is carried out at atmospheric pressure and preferably at a temperature in the range from −20 to +50° C. The oxirane product (I) may be isolated from the reaction mixture by distillation.

In the examples which follow, parts are by weight unless otherwise indicated. Example I represents a preferred embodiment.

EXAMPLE I

Part A

A mixture of 750 parts of malononitrile, 40 parts of anhydrous zinc chloride, and 1500 parts of hexafluoroacetone is heated in a closed pressure vessel at 80° C. for eight hours. An off-white crystalline solid, 2110 parts, is obtained after the reactor is cooled and vented. It is recrystallized from methylene chloride to give hydroxy-bis(trifluoromethyl)methylmalononitrile as hygroscopic white needles, M. P. 59–70° C.

Part B

A mixture of 2110 parts of hydroxybis(trifluoromethyl)methylmalononitrile and 4540 parts of phosphorous pentoxide is heated strongly in a simple still until no further distillate is connected. The distillate is filtered and redistilled to give 970 parts of 1,1-bis(trifluoromethyl)-2,2-dicyanoethylene: B.P. 107°; $n_D^{25}$, 1.3526; $D_4^{25}$, 1.479.

Part C 1,1 - bis(trifluoromethyl) - 2,2 - dicyanoethylene (428 parts) is added slowly to 400 parts of 40% peracetic acid in acetic acid. The mixture is stirred and cooled, and the rate of addition is adjusted so that the temperature does not rise above 50° C. At the end of the addition about 20 parts of mercaptoacetic acid is added to destroy excess peracetic acid. The reaction mixture is distilled and a fraction boiling from 75–98° C. is collected. Redistillation gives 355 parts of 2,2-dicyano-3,3-bis(trifluoromethyl)oxirane in the form of a colorless liquid boiling at 96° C. which solidifies to a colorless solid melting at 46–47° C.

Part D

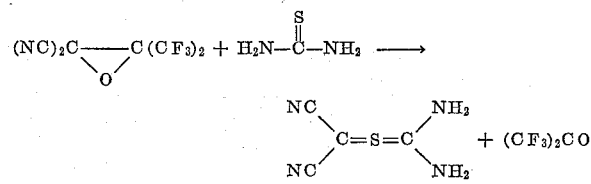

A mixture of 1184 parts of ethyl alcohol, 76 parts of thiourea, and 230 parts of 2,2-dicyano-3,3-bis(trifluoromethyl)oxirane is stirred at room temperature until solution is complete. An exothermic reaction occurs, and the reaction mixture warms spontaneously to 50°. Ether, 7135 parts, is added, and the precipitate that forms is collected on a filter and washed with ether. Recrystallization from alcohol-ether gives 110 parts (79% yield) of dicyano-S-(diaminomethylene)sulfilidene as colorless prisms, M.P. 114–5° C. (dec., black). The infrared spectrum shows bands at 2.94, 3.05, and 3.19μ for $NH_2$ and 4.65 and 4.57μ for conjugated CN.

*Analysis.*—Calcd. for $C_4H_4N_4S$: C, 34.28; H, 2.88; N, 39.98; S, 22.87. Found: C, 34.44; H, 3.30; N, 39.43; S, 22.36.

EXAMPLE II

Dicyano-S-(diaminomethylene)sulfilidene is also obtained directly from 1,1-dicyano-2,2-bis(trifluoromethyl) ethylene, hydrogen peroxide, and thiourea without isolating the intermediate oxirane. One hundred eleven parts of 30% hydrogen peroxide is added in small portions to a stirred solution of 214 parts of 1,1-dicyano-2,2-bis(trifluoromethyl)ethylene in 1184 parts ethyl alcohol at 0° C. Then 76 parts of powdered thiourea is added portionwise. Ether, 2854 parts, is added, and the precipitate that forms is collected by filtration, washed with ether, and recrystallized from water (water not heated above 50°). There is obtained 67 parts of dicyano-S-(diaminomethylene)sulfilidene as colorless, mating needles, M.P. 114–115° C. (dec.).

EXAMPLE III

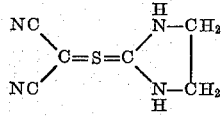

2,2 - dicyano - 3,3 - bis(trifluoromethyl)oxirane, 1250 parts, is added portionwise to a stirred suspension of 501 parts of finely powdered 2-imidazolidinethione in 15,786 parts of ethanol. An exothermic reaction ensues, and the reaction mixture warms spontaneously to 47°. The reaction mixture is stirred for two hours, and the suspended solid is collected on a filter and washed thoroughly with alcohol. There is obtained 780 parts (80% yield) of crude dicyano-S-(2-imidazolidinylidene)-sulfilidene as near-white crystals, M.P. 170–175° C. (dec., black). A sample is recrystallized from a large volume of alcohol for analysis. The infrared spectrum shows a broad band at $3.15\mu$ for NH, $3.42\mu$ for saturated CH, and $4.58\mu$ and $4.67\mu$ for conjugated CN. The product is soluble in dilute aqueous sodium hydroxide, and is precipitated unchanged from this solution with dilute hydrochloric acid.

*Analysis.*—Calcd. for $C_6H_6N_4S$: C, 43.36; H, 3.65; N, 33.71; S, 19.28. Found: C, 43.56; H, 3.71; N, 33.88; S, 18.74.

EXAMPLE IV

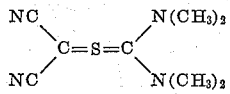

Tetramethylthiourea, 264 parts, is added portionwise to a stirred solution of 460 parts of 2,2-dicyano-3,3-bis(trifluoromethyl)oxirane in 793 parts of methanol at 0° C. An exothermic reaction ensues, and the solution becomes yellow as the thiourea dissolves. The solution is cooled to −40° C., and the solid that separates is collected on a filter to give 365 parts (80% yield) of crude crystalline product. Recrystallization from methanol, keeping the temperature below 30° C., gives 293 parts of dicyano - S - bisdimethylaminomethylene)sulfilidene as colorless plates. The melting point is about 70° C. (with decomposition to black products) when heated rapidly. The product may be stored at −70° C., but decomposes upon remaining at room temperature for a few days. The infrared spectrum shows bands at $4.62$ and $4.70\mu$ for conjugated nitrile.

*Analysis.*—Calcd. for $C_8H_{12}N_4S_2$: C, 42.08; H, 5.31; N, 24.55; S, 28.10. Found: C, 42.58; H, 5.38; N, 24.59; S, 28.20.

EXAMPLE V

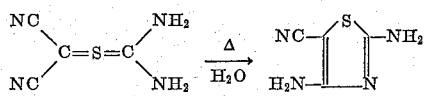

Dicyano-S-(diaminomethylene)sulfilidene, 40 parts, is dissolved in 200 parts of hot water, and the solution is heated to reflux for one hour. Decolorizing charcoal ("Darco"), 50 parts, is added to the hot black solution, and the reaction mixture is filtered. The filtrate is cooled, and the needles that separate are collected on a filter and recrystallized from water. There is obtained 19 parts of 2,4-diamino-5-cyanothiazole as colorless needles, M.P. 190–192° C. The infrared spectrum shows bands at 3.04 and $3.13\mu$ for $NH_2$, $4.59\mu$ for conjugated CN, and $6.50\mu$ and $6.57\mu$ for aromatic unsaturation.

*Analysis.*—Calcd. for $C_4H_4N_4S$: C, 34.28; H, 2.88; N, 39.98; S, 22.87. Found: C, 34.50; H, 2.88; N, 40.09; S, 23.30.

When the alkyl-substituted thioureas shown in Table I are substituted for thiourea in the procedure of Part D of Example I, the indicated dicyano-S-(substituted-diaminomethylene)sulfilidenes are obtained.

TABLE I

| Alkyl-substituted thiourea | Dicyano-S-(diaminomethylene) sulfilidene product |
|---|---|
| 1,1,3-trimethyl-2-thiourea | NC\\C=S=C/N(CH₃)₂, NC/ \\NHCH₃<br>Dicyano-S-[(dimethylamino)-(methylamino)methylene] sulfilidene |
| 1,1,3-triethyl-4-thiourea | NC\\C=S=C/N(C₂H₅)₂, NC/ \\NHC₂H₅<br>Dicyano-S-[(diethylamino)-(ethylamino)methylene] sulfilidene |
| 1,1,3,3-tetrabutyl-2-thiourea | NC\\C=S=C/N(C₄H₉)₂, NC/ \\N(C₄H₉)₂<br>Dicyano-S-[bis(dibutylamino)methylene] sulfilidene |
| 1,3-dicyclohexyl-2-thiourea | NC\\C=S=C/N-cyclohexyl, NC/ \\N-cyclohexyl<br>Dicyano-S-[bis(cyclohexylamino)methylene] sulfilidene |
| 1-dodecyl-2-thiourea | NC\\C=S=C/NHC₁₂H₂₅, NC/ \\NH₂<br>Dicyano-S-[(amino)(dodecylamino)methylene]sulfilidene |
| 1,3-dioctadecyl-2-thiourea | NC\\C=S=C/NHC₁₈H₃₇, NC/ \\NHC₁₈H₃₇<br>Dicyano-S-[bis(octadecylamino)methylene]sulfilidene |
| 1,1'-thiocarbonyl-dipiperidine | NC\\C=S=C/N-piperidino, NC/ \\N-piperidino<br>Dicyano-S-[bis(piperidino)methylene] sulfilidene |

When the 2,2-dicyano - 3,3 - bis(polyfluorohaloalkyl) oxiranes shown in Table II are substituted for 2,2-dicyano-3,3-bis(trifluoromethyl)oxirane in the procedure of any of the preceding examples, the same sulfilidene products are obtained. For example, when they are substituted in Example I, dicyano-S-(diaminomethylene)sulfilidene is obtained. In addition to the 2,2-dicyano-3,3-bis(polyfluorohaloalkyl)oxiranes (Table II shows the perfluoroalkyl ketone starting materials and the 1,1-dicyano-2,2-bis(fluoroalkyl)ethylene intermediates from which they are prepared by the procedures described above.

TABLE II

| Fluoroalkyl ketone | 1,1-dicyano-2,2-bis(fluoroalkyl)ethylene | 2,2-dicyano-3,3-bis(fluoroalkyl)oxirane |
| --- | --- | --- |
| Hexafluorocyclobutanone | Dicyanomethylenehexafluorocyclobutane | 2,2-dicyano-4,4,5,5,6,6-hexafluoro-1-oxaspiro-[2.3]hexane. |
| Octafluorocyclopentanone | Dicyanomethyleneoctafluorocyclopentane | 2,2-dicyano-4,4,5,5.6,6,7,7-octafluoro-1-oxaspiro[2.4]heptane. |
| Decafluorocyclohexanone | Dicyanomethylenedecafluorocyclohexane | 2,2-dicyano-4,4,5,5,6,6,7,7,8,8-decafluoro-1-oxaspiro[2.5]octane. |
| Decafluoro-3-pentanone | 1,1-dicyano-2,2-bis(pentafluoroethyl)ethylene | 2,2-dicyano-3,3-bis(pentafluoroethyl)oxirane. |
| Decafluoro-2-pentanone | 1,1-dicyano-2-heptafluoropropyl-2-trifluoromethylethylene | 2,2-dicyano-3-heptafluoropropyl-3-trifluoromethyloxirane. |
| Perfluoro-3-decanone | 1,1-dicyano-2-perfluoroethyl-2-perfluoroheptylethylene | 2,2-dicyano-3-perfluoroethyl-3-perfluoroheptyloxirane. |
| Perfluoro-8-pentadecanone | 1,1-dicyano-2,2-bis(perfluoroheptyl)ethylene | 2,2-dicyano-3,3-bis(perfluoroheptyl)oxirane. |
| Perfluoro-2-nonadecanone | 1,1-dicyano-2-perfluoroheptadecyl-2-perfluoromethylethylene | 2,2-dicyano-3-perfluoroheptadecyl-3-perfluoromethyloxirane. |
| Perfluoro-18-pentatriacontanone | 1,1-dicyano-2,2-bis(perfluoroheptadecyl)ethylene | 2,2-dicyano-3,3-bis(perfluoroheptadecyl)oxirane. |
| 1,3-dichloro-1,1,3,3-tetrafluoro-2-propanone | 1,1-dicyano-2,2-bis(chlorodifluoromethyl)ethylene | 2,2-dicyano-3,3-bis(chlorodifluoromethyl)oxirane. |
| 1,9-dichloroperfluoro-5-nonanone | 1,1-dicyano-2,2-bis(4-chloroperfluorobutyl)ethylene | 2,2-dicyano-3,3-bis(4-chloroperfluorobutyl)oxirane. |
| 1,13-dichloroperfluoro-7-tridecanone | 1,1-dicyano-2,2-bis(6-chloroperfluorohexyl)ethylene | 2,2-dicyano-3,3-bis(6-chloroperfluorohexyl)oxirane. |
| 1H-pentafluoro-2-propanone | 1,1-dicyano-2-difluoromethyl-2-trifluoromethylethylene | 2,2-dicyano-3-difluoromethyl-3-trifloromethyloxirane. |
| 1H,3H-tetrafluoro-2-propanone | 1,1-dicyano-2,2-bis(difluoromethyl)ethylene | 2,2-dicyano-3,3-bis(difluoromethyl)oxirane. |
| 1H,17H-perfluoro-5-heptadecanone | 1,1-dicyano-2-(4H-perfluorobutyl)-2-(12H-perfluorododecyl)ethylene | 2,2-dicyano-3-(4H-perfluorobutyl)-3-(12H-perfluorododecyl)oxirane. |
| H,25H-perfluoro-13-pentacosanone | 1,1-dicyano-2,2-bis(12H-perfluorododecyl)ethylene | 2,2-dicyano-3,3-bis(12H-perfluorododecyl)oxirane. |

The compounds of this invention when applied to paper render the paper useful for inkless printing. This use is illustrated below:

A sheet of porous paper of about 64 cm.$^2$ in area (9 cm. filter paper) was thoroughly saturated with a solution prepared by dissolving 0.1 g. of $$(NC)_2C=S=C(NH_2)_2$$

prepared as in Example I, in 5 ml. of acetone. The paper was allowed to dry. The appearance of the paper was unchanged after this treatment. The treated paper was placed on a wooden block. Clean type (copper penny) was heated to 150° C. and pressed against the paper for one second. A brown, sharp impression of the type was developed on the paper. When the type was heated to 300° C. and similarly pressed against untreated paper, no permanent impression was made.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

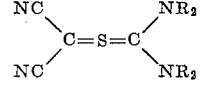

wherein each of the R's, taken singly, represents a member selected from the group consisting of hydrogen and aliphatically saturated alkyl and cycloalkyl of up to 20 carbons, and any two R's may be taken together to form alkylene of 2–7 carbons.

2. Dicyano-S-(diaminoethylene)sulfilidene.
3. Dicyano-S-(2-imidazolidinylidene)sulfilidene.
4. Dicyano-S-(bisdimethylaminomethylene)sufilidene.
5. A process of preparing a compound of claim 1 which comprises contacting a compound of the formula

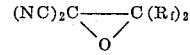

wherein each of the $R_f$'s, taken singly, is of up to 18 carbons and represents a member selected from the group consisting of perfluoroalkyl, ω-chloroperfluoroalkyl and ω-hydroperfluoroalkyl, and the two $R_f$'s, conjointly are perfluoroalkylene of 3–8 carbons, with a compound of the formula

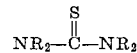

wherein R is as defined in claim 1, at a temperature from −80° to 250° C.

No references cited.

IRVING MARCUS, *Primary Examiner.*

NICHOLAS S. RIZZO, *Examiner.*